United States Patent
Lin et al.

(10) Patent No.: US 11,222,650 B2
(45) Date of Patent: Jan. 11, 2022

(54) DEVICE AND METHOD FOR GENERATING SYNCHRONOUS CORPUS

(71) Applicant: National Chung Cheng University, Chia-Yi (TW)

(72) Inventors: Tay Jyi Lin, Chia-Yi (TW); Ching Wei Yeh, Chia-Yi (TW); Shun Pu Yang, Liujiao Township, Chiayi County (TW); Chen Zong Liao, Taichung (TW)

(73) Assignee: NATIONAL CHUNG CHENG UNIVERSITY, Chia-Yi (TW)

( * ) Notice: Subject to any disclaimer, the term of this patent is extended or adjusted under 35 U.S.C. 154(b) by 0 days.

(21) Appl. No.: 16/823,036

(22) Filed: Mar. 18, 2020

(65) Prior Publication Data
US 2021/0225384 A1    Jul. 22, 2021

(30) Foreign Application Priority Data

Jan. 16, 2020   (TW) .................................. 109101557

(51) Int. Cl.
*G10L 21/0364* (2013.01)
*G10L 25/30* (2013.01)
(Continued)

(52) U.S. Cl.
CPC .......... *G10L 21/0364* (2013.01); *G10L 13/00* (2013.01); *G10L 15/187* (2013.01);
(Continued)

(58) Field of Classification Search
CPC ..... G10L 21/0364; G10L 15/26; G10L 13/00; G10L 15/187; G10L 25/66; G10L 25/30; G10L 2021/0135
See application file for complete search history.

(56) References Cited

U.S. PATENT DOCUMENTS 8,340,966 B2 * 12/2012 Kerimovska ........... G10L 13/00
                                                    704/260
2009/0245695 A1 * 10/2009 Foss .................... G06K 9/2081
                                                    382/312

FOREIGN PATENT DOCUMENTS

EP       1028410 A1 *  8/2000  ........... G10L 15/063
JP    2011123141 A  *  6/2011

OTHER PUBLICATIONS

Celin (T. A. Mariya Celin et al., "A Weighted Speaker-Specific Confusion Transducer-Based Augmentative and Alternative Speech Communication Aid for Dysarthric Speakers," in IEEE Transactions on Neural Systems and Rehabilitation Engineering, vol. 27, No. 2 (Year: 2019).*

(Continued)

*Primary Examiner* — Paras D Shah
(74) *Attorney, Agent, or Firm* — Muncy, Geissler, Olds & Lowe, P.C.

(57) ABSTRACT

A device and a method for generating synchronous corpus is disclosed. Firstly, script data and a dysarthria voice signal having a dysarthria consonant signal are received and the position of the dysarthria consonant signal is detected, wherein the script data have text corresponding to the dysarthria voice signal. Then, normal phoneme data corresponding to the text are searched and the text is converted into a normal voice signal based on the normal phoneme data corresponding to the text. The dysarthria consonant signal is replaced with the normal consonant signal based on the positions of the normal consonant signal and the dysarthria consonant signal, thereby synchronously converting the dysarthria voice signal into a synthesized voice signal. The synthesized voice signal and the dysarthria voice signal (Continued)

are provided to train a voice conversion model, retain the timbre of the dysarthria voices and improve the communication situations.

13 Claims, 3 Drawing Sheets

(51) Int. Cl.
  *G10L 25/66* (2013.01)
  *G10L 15/187* (2013.01)
  *G10L 13/00* (2006.01)
  *G10L 15/26* (2006.01)
  *G10L 21/013* (2013.01)

(52) U.S. Cl.
  CPC .............. *G10L 15/26* (2013.01); *G10L 25/30* (2013.01); *G10L 25/66* (2013.01); *G10L 2021/0135* (2013.01)

(56) References Cited

OTHER PUBLICATIONS

Nakayama (S. Nakayama, A. Tjandra, S. Sakti and S. Nakamura, "Speech Chain for Semi-Supervised Learning of Japanese-English Code-Switching ASR and TTS," 2018 IEEE Spoken Language Technology Workshop (SLT), 2018, pp. 182-189, (Year: 2018).*

He (He, L., Wang, X., Zhang, J. et al. Automatic detection of consonant omission in cleft palate speech. Int J Speech Technol 22, 59-65 (2019). https://doi.org/10.1007/s10772-018-09570-w) (Year: 2019).*

Aihara, Ryo, Tetsuya Takiguchi, and Yasuo Ariki. "Individuality-preserving voice conversion for articulation disorders using locality-constrained NMF." Proceedings of the Fourth Workshop on Speech and Language Processing for Assistive Technologies. 2013.*

\* cited by examiner

DEVICE AND METHOD FOR GENERATING SYNCHRONOUS CORPUS

This application claims priority for Taiwan patent application no. 109101557 filed on 16 Jan. 2020, the content of which is incorporated by reference in its entirely.

BACKGROUND OF THE INVENTION

Field of the Invention

The present invention relates to the voice generating technology, particularly to a device and a method for generating synchronous corpus.

Description of the Related Art

Dysarthria patients are characterized by lisp because of the abnormalities in muscle strength and timbre and low speech speed while speaking, therefore it is hard for other people to understand the dysarthria patient's speech, which impacts the quality of the dysarthria patient's life. Most of the dysarthria patients include stroke patients, cerebral palsy patients, and Parkinson's disease patients. Although drugs for delaying neurodegeneration and rehabilitation treatments for improving muscle control have been developed, the treatment effects of the drugs and rehabilitation treatments vary from person to person, and usually do not improve the conditions substantially.

Some researchers have proposed to use a voice conversion technology to crystallize a patient's voice by a voice conversion model, so as to enhance the patient's voice intelligibility and comprehension and reduce patients' communication barriers. The Gaussian mixture model (GMM) and the deep neural network (DNN) are generally used in the voice conversion system. The manner of using the Gaussian mixture model (GMM) is to extract speech features of the reference corpus and patient corpus, and find relationships between the speech features of reference corpus and patient corpus as a basis of mapping the speech features of the patient corpus to those of the reference corpus. In order to find the relationships, the sentences of the reference corpus and the patient corpus need to be aligned first. Furthermore, the manner of using a deep neural network (DNN) is to perform a framing process on the reference corpus and the patient corpus, and then use the DNN to learn the relationships between aligned frames of the reference corpus and the patient corpus in time domain. Since the time unit of the frame can be as small as a millisecond, the DNN incorrectly learns the relationships between aligned frames of the reference corpus and the patient corpus due to any slight offsets of the alignment between the reference corpus and the patient corpus, which may obviously impact the voice conversion quality.

According to the above-mentioned content, the corpus alignment is one of the factors affecting the voice conversion quality. The conventional technologies include dynamic time warping (DTW) and pitch synchronous overlap and add (PSOLA). The two technologies are mostly performed by analyzing the relationships of the two corpuses in time domain. For example, dynamic time warping (DTW) is a method of calculating similarity of two time sequences and suitable for time sequences with different lengths and different tempos, and local scaling is performed on the time axis to make the states of the two time sequences as consistent as possible. In real life, even if the same person speaks the same word or sentence, the speed and rhythm of each speech signal will be different. Thus, DTW is used to compare the similarity of speech signals. Pitch synchronous overlap and add (PSOLA) is a digital signal processing technology for changing the timbre and duration of speech signals. It can divide a speech signal into multiple overlapped frames. When a distance between the frames is adjusted to be closer or further, the timbre will be improved or degraded. The number of the overlapped frames is increased or decreased to respectively increase or decrease the duration of speech signals. The well-aligned corpuses can produce a better voice conversion effect. As a result, the voice conversion system is quite based on DTW or PSOLA. However, in the dysarthria patients' voice conversion system, the conventional alignment technology does not completely align reference corpus to patient corpus due to unclear patients' voices. It costs high manpower and a lot of time to manually align reference corpus to patient corpus. In the present trained corpuses, the waveform of the reference corpus is greatly different from that of the patient corpus. Accordingly, when reference corpus is incompletely aligned to patient corpus, the DNN incorrectly learns the relationships between the aligned corpuses such that popping or noise occurs in the converted voices.

To overcome the abovementioned problems, the present invention provides a device and a method for generating synchronous corpus.

SUMMARY OF THE INVENTION

The primary objective of the present invention is to provide a device and a method for generating synchronous corpus, which use a known script to replace a dysarthria consonant signal with a normal consonant signal, thereby generating clear voices that synchronize with dysarthria voices. The clear voices, used as reference corpuses for a voice conversion training system in the subsequent process, retain the timbre of the dysarthria voices and improve the communication situations.

To achieve the abovementioned objectives, the present invention provides a device for generating synchronous corpus. The device for generating synchronous corpus receives a dysarthria voice signal having a dysarthria consonant signal. The device comprises a phoneme database, a syllable detector, and a voice synthesizer. The phoneme database is configured to store normal phoneme data. The syllable detector is configured to receive the dysarthria voice signal, detect the position of the dysarthria consonant signal, and generate position data based on the position of the dysarthria consonant signal. The voice synthesizer is electrically connected to the syllable detector. The voice synthesizer is in communication with the phoneme database. The voice synthesizer is configured to receive the dysarthria voice signal, the position data, and script data, search from the script data text corresponding to the dysarthria voice signal, search from the phoneme database the normal phoneme data corresponding to the text, convert the text into a normal voice signal based on the normal phoneme data corresponding to the text, cooperate with the syllable detector to detect the position of a normal consonant signal of the normal voice signal, and replace the dysarthria consonant signal with the normal consonant signal based on the position of the normal consonant signal and the position of the dysarthria consonant signal, thereby synchronously converting the dysarthria voice signal into a synthesized voice signal, and the synthesized voice signal and the dysarthria voice signal are provided to train a voice conversion model.

In an embodiment of the present invention, the voice synthesizer is configured to convert the text into the normal voice signal using a text to speech (TTS) technology.

In an embodiment of the present invention, the phoneme database is a consonant database and the normal phoneme data are normal consonant data.

In an embodiment of the present invention, the syllable detector is configured to detect the positions of the normal consonant signal and the dysarthria consonant signal using an autocorrelation function or a deep neural network (DNN).

In an embodiment of the present invention, the device for generating synchronous corpus further comprises a voice smoothing circuit electrically connected to the voice synthesizer and configured to receive the synthesized voice signal and filter out noise of the synthesized voice signal, and the filtered synthesized voice signal and the dysarthria voice signal are provided to train the voice conversion model.

In an embodiment of the present invention, the voice smoothing circuit is a filter.

In an embodiment of the present invention, the voice conversion model is a Gaussian mixture model (GMM) or a deep neural network (DNN) model.

In an embodiment of the present invention, the device for generating synchronous corpus further comprises a text scanner electrically connected to the voice synthesizer and configured to scan a script to generate the script data.

The present invention also provides a method for generating synchronous corpus comprising: receiving script data and a dysarthria voice signal having a dysarthria consonant signal and detecting the position of the dysarthria consonant signal, wherein the script data have text corresponding to the dysarthria voice signal; and searching normal phoneme data corresponding to the text, converting the text into a normal voice signal based on the normal phoneme data corresponding to the text, detecting the position of the normal consonant signal of the normal voice signal, replacing the dysarthria consonant signal with the normal consonant signal based on the position of the normal consonant signal and the position of the dysarthria consonant signal, thereby synchronously converting the dysarthria voice signal into a synthesized voice signal, and the synthesized voice signal and the dysarthria voice signal are provided to train a voice conversion model.

In an embodiment of the present invention, in the step of converting the text into the normal voice signal, a text to speech (TTS) technology is used to convert the text into the normal voice signal.

In an embodiment of the present invention, the normal phoneme data are normal consonant data.

In an embodiment of the present invention, in the step of detecting the position of the dysarthria consonant signal, an autocorrelation function or a deep neural network (DNN) is used to detect the position of the dysarthria consonant signal.

In an embodiment of the present invention, in the step of detecting the position of the normal consonant signal, an autocorrelation function or a deep neural network (DNN) is used to detect the position of the normal consonant signal.

In an embodiment of the present invention, after the step of converting the dysarthria voice signal into the synthesized voice signal, the noise of the synthesized voice signal is filtered out, and the filtered synthesized voice signal and the dysarthria voice signal are provided to train the voice conversion model.

In an embodiment of the present invention, the voice conversion model is a Gaussian mixture model (GMM) or a deep neural network (DNN) model.

Below, the embodiments are described in detail in cooperation with the drawings to make easily understood the technical contents, characteristics and accomplishments of the present invention.

DETAILED DESCRIPTION OF THE INVENTION

Figure 1:
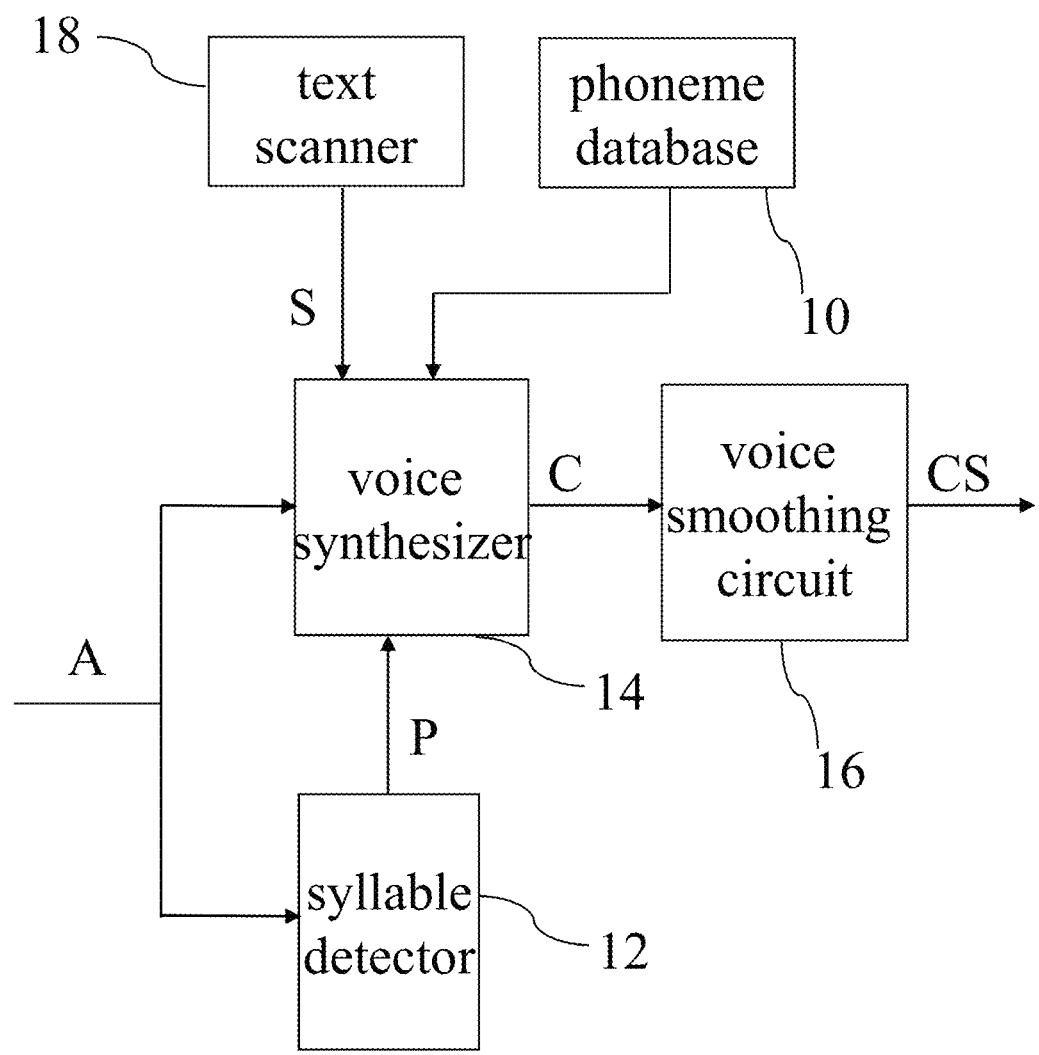
FIG. 1 is a diagram illustrating a device for generating synchronous corpus according to an embodiment of the present invention.

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled with," "couples with," and "coupling with" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means. The term "and/or" may comprise any and all combinations of one or more of the associated listed items. In addition, the singular forms "a," "an," and "the" herein are intended to comprise the plural forms as well, unless the context clearly indicates otherwise.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Referring to FIG. 1, the device for generating synchronous corpus of the present invention is introduced. Based on syllables, the device for generating synchronous corpus provides self-aligned trained corpuses to simplify pre-processing performed by a voice conversion system, such as dynamic time warping (DTW) and pitch synchronous overlap and add (PSOLA). The present invention aligns trained corpuses and provides the trained corpuses for the voice conversion system without costing high manpower and a lot of time. The voice conversion system converts mispronounced or dysarthria voices into normal voices that are clearer and recognizable, thereby improving communication situations. The present invention converts a dysarthria voice signal into a synthesized voice signal. The device for generating synchronous corpus automatically generates aligned corpuses only based on the dysarthria voice signal and a known script.

The device for generating synchronous corpus receives a dysarthria voice signal A having a dysarthria consonant signal. The device for generating synchronous corpus comprises a phoneme database 10, a syllable detector 12, a voice synthesizer 14, a voice smoothing circuit 16, and a text scanner 18. For example, the voice smoothing circuit 16 may be a filter. The phoneme database 10 is configured to store normal phoneme data. The syllable detector 12 is configured to receive the dysarthria voice signal A, detect the position of the dysarthria consonant signal, and generate position data P based on the position of the dysarthria consonant signal. For example, the syllable detector 12 is configured to detect the position of the dysarthria consonant signal of the dysarthria voice signal A using an autocorrelation function or a deep neural network (DNN). The text scanner 18 is electrically connected to the voice synthesizer 14 and configured to scan a script to generate script data S. The voice synthesizer 14 is electrically connected to the syllable detector 12. The voice synthesizer 14 is in communication with the phoneme database 10. The voice synthesizer 14 is configured to receive the dysarthria voice signal A, the position data P, and the script data S and search from the script data S text corresponding to the dysarthria voice signal A. The voice synthesizer 14 is connected to the phoneme database 10 via a network or electrically connected to the phoneme database 10. The voice synthesizer 14 is configured to search from the phoneme database 10 the normal phoneme data corresponding to the text, convert the text into a normal voice signal based on the normal phoneme data corresponding to the text, cooperate with the syllable detector 12 to detect the position of the normal consonant signal of the normal voice signal, and replace the dysarthria consonant signal with the normal consonant signal based on the position of the normal consonant signal and the position of the dysarthria consonant signal, thereby synchronously converting the dysarthria voice signal A into a synthesized voice signal C that is clearer. For example, the syllable detector 12 is configured to detect the position of the normal consonant signal of the normal voice signal using an autocorrelation function or a deep neural network (DNN). The voice smoothing circuit 16 is electrically connected to the voice synthesizer 14 and configured to receive the synthesized voice signal C and filter out the noise of the synthesized voice signal C to improve the naturalness of voices. The filtered synthesized voice signal CS and the dysarthria voice signal A are provided to train a voice conversion model, such as a Gaussian mixture model (GMM) or a deep neural network (DNN) model. In some embodiments of the present invention, the voice synthesizer 14 is configured to convert the text into the normal voice signal using a text to speech (TTS) technology. Alternatively, the phoneme database 10 is a consonant database and the normal phoneme data are normal consonant data. Thus, the voice synthesizer 14 directly converts the text corresponding to the dysarthria voice signal A into the normal voice signal.

The method for generating synchronous corpus of the present invention is introduced as follows. Firstly, the syllable detector 12 receives the dysarthria voice signal A, detects the position of the dysarthria consonant signal, and generates the position data P based on the position of the dysarthria consonant signal. Simultaneously, the text scanner 18 scans the script to generate the script data S. Then, the voice synthesizer 14 receives the dysarthria voice signal A, the position data P, and the script data S and searches from the script data S the text corresponding to the dysarthria voice signal A. The voice synthesizer 14 searches from the phoneme database 10 the normal phoneme data corresponding to the text, converts the text into the normal voice signal based on the normal phoneme data corresponding to the text, cooperates with the syllable detector 12 to detect the position of the normal consonant signal of the normal voice signal, and replace the dysarthria consonant signal with the normal consonant signal based on the position of the normal consonant signal and the position of the dysarthria consonant signal, thereby synchronously converting the dysarthria voice signal A into a synthesized voice signal C. Finally, the voice smoothing circuit 16 receives the synthesized voice signal C and filters out the noise of the synthesized voice signal C. When the filtered synthesized voice signal CS is generated, the filtered synthesized voice signal CS has been aligned to the dysarthria voice signal A. Thus, the filtered synthesized voice signal CS and the dysarthria voice signal A are provided to train a voice conversion model.

Figure 2:
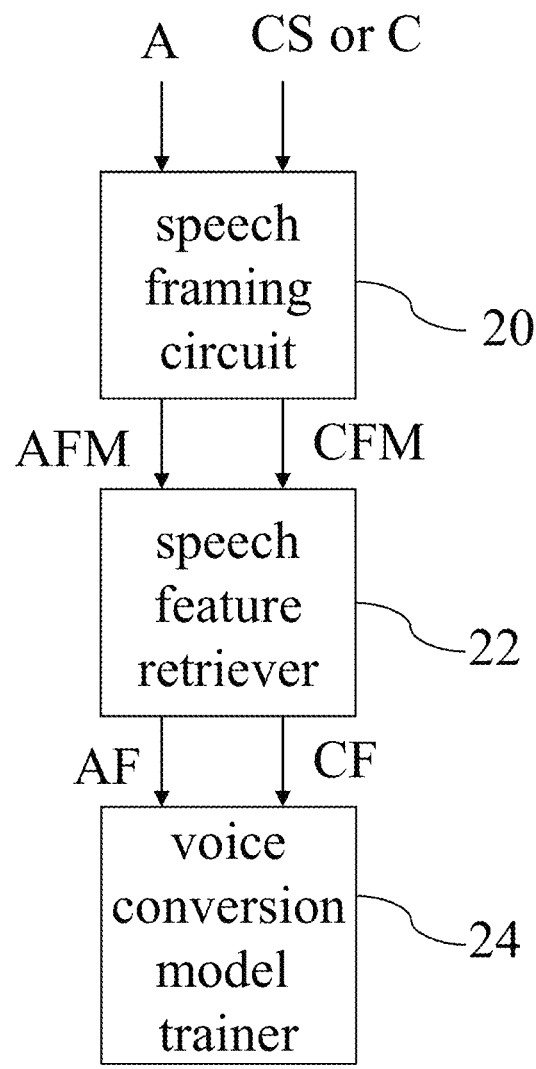
FIG. 2 is a diagram illustrating a voice conversion training system according to an embodiment of the present invention.
Figure 3:
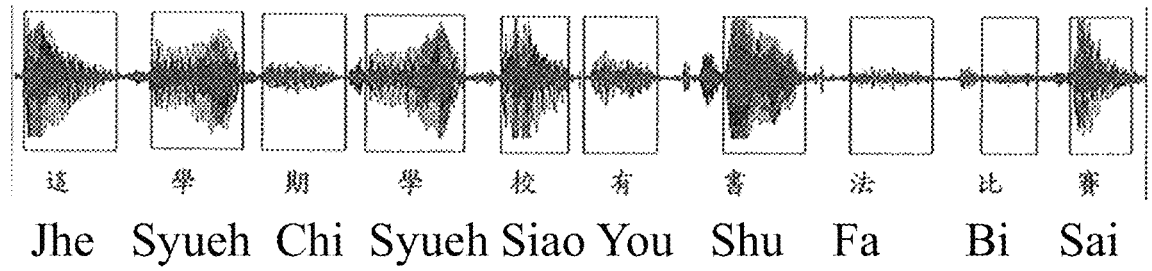
FIG. 3 is a diagram illustrating a waveform of a dysarthria voice signal according to an embodiment of the present invention.

Referring to FIG. 1 and FIG. 2, a voice conversion training system includes a speech framing circuit 20, a speech feature retriever 22, and a voice conversion model trainer 24. The speech framing circuit 20, electrically connected to the voice smoothing circuit 16, receives and frames the dysarthria voice signal A and the filtered synthesized voice signal CS to generate dysarthria speech frames AFM and synthesized speech frames CFM. The speech feature retriever 22, electrically connected to the speech framing circuit 20, receives the dysarthria speech frames AFM and the synthesized speech frames CFM to retrieve dysarthria speech features AF and corresponding synthesized speech features CF. The dysarthria speech features AF and the synthesized speech features CF may be frequency spectrums and Mel-scale frequency Cepstral coefficients (MFCC). The voice conversion model trainer 24, electrically connected to the speech feature retriever 22, receives the dysarthria speech features AF and the synthesized speech features CF to train the voice conversion model.

In the abovementioned embodiment, the voice smoothing circuit 16 may be omitted and the voice synthesizer 14 is directly electrically connected to the speech framing circuit 20. Thus, the speech framing circuit 20 receives and frames the dysarthria voice signal A and the synthesized voice signal C to generate dysarthria speech frames AFM and synthesized speech frames CFM. In other words, the voice conversion training system uses the dysarthria voice signal A and the synthesized voice signal C to train a voice conversion model. Besides, the text scanner 18 may be omitted as long as the voice synthesizer 14 receives the script data S.

Figure 4:
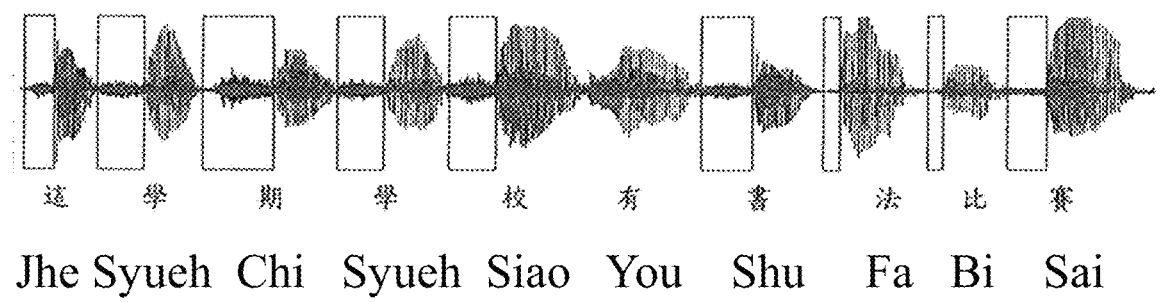
FIG. 4 is a diagram illustrating a waveform of a normal voice signal according to an embodiment of the present invention.
Figure 5:
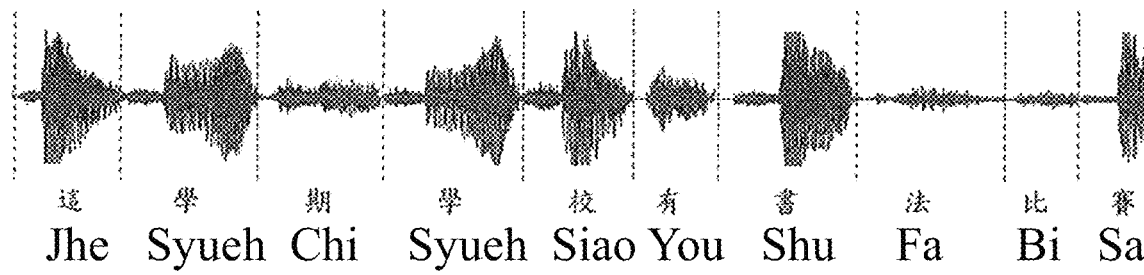
FIG. 5 is a diagram illustrating a waveform of a synthesized voice signal according to an embodiment of the present invention.

Refer to FIG. 1, FIG. 3, FIG. 4, and FIG. 5. The present invention replaces the consonants of the dysarthria voice signal A to improve the speech intelligibility, and retains the vowels of the dysarthria voice signal A, so that the synthesized voice signal C automatically is aligned to the dysarthria voice signal A. Take Chinese voices as an example. As shown by solid blocks in FIG. 3, the syllable detector 12 positions the vowels of the dysarthria voice signal A since the Chinese vowels pronounce periodically. Thus, the syllable detector 12 positions the consonants of the dysarthria voice signal A according to the positions of the vowels of the dysarthria voice signal A. FIG. 4 is a diagram illustrating a waveform of the normal voice signal converted by the voice synthesizer 14, wherein the normal consonant signal enclosed by solid blocks and determined by the syllable detector 12. FIG. 5 is a diagram illustrating a waveform of the synthesized voice signal C according to an embodiment of the present invention. Regardless of whether the synthesized voice signal C is processed by the voice smoothing circuit 16, the synthesized voice signal C is aligned to the dysarthria voice signal A and the synthesized voice signal C and the dysarthria voice signal A are synchronously transmitted to the voice conversion model trainer 24. In addition, the timbre of the dysarthria voice signal A is retained after voice conversion since the vowels of the synthesized voice signal C and the dysarthria voice signal A are the same.

In conclusion, the present invention uses a known script to replace a dysarthria consonant signal with a normal consonant signal, thereby generating clear voices that synchronize with dysarthria voices. The clear voices, used as reference corpuses for a voice conversion training system in the subsequent process, retain the timbre of the dysarthria voices and improve the communication situations.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A device for generating synchronous corpus receiving a dysarthria voice signal having a dysarthria consonant signal, and the device comprising:
    a phoneme database configured to store normal phoneme data;
    a syllable detector configured to receive the dysarthria voice signal, detect a position of the dysarthria consonant signal, and generate position data based on the position of the dysarthria consonant signal; and
    a voice synthesizer electrically connected to the syllable detector, wherein the voice synthesizer is in communication with the phoneme database, the voice synthesizer is configured to receive the dysarthria voice signal, the position data, and script data, search from the script data text corresponding to the dysarthria voice signal, search from the phoneme database the normal phoneme data corresponding to the text, convert the text into a normal voice signal based on the normal phoneme data corresponding to the text, cooperate with the syllable detector to detect a position of a normal consonant signal of the normal voice signal, and replace the dysarthria consonant signal with the normal consonant signal based on the position of the normal consonant signal and the position of the dysarthria consonant signal, thereby synchronously converting the dysarthria voice signal into a synthesized voice signal, and the synthesized voice signal and the dysarthria voice signal are provided to train a voice conversion model;
    wherein the synthesized voice signal and the dysarthria voice signal are received by a voice conversion training system to train the voice conversion model, and the voice conversion training system includes:
        a speech framing circuit electrically connected to the voice synthesizer and configured to receive and frame the synthesized voice signal and the dysarthria voice signal to generate synthesized speech frames and dysarthria speech frames;
        a speech feature retriever electrically connected to the speech framing circuit and configured to receive the dysarthria speech frames and the synthesized speech frames to retrieve dysarthria speech features and corresponding synthesized speech features; and
        a voice conversion model trainer electrically connected to the speech feature retriever and configured to receive the dysarthria speech features and the corresponding synthesized speech features to train the voice conversion model;
    wherein the voice conversion model is a Gaussian mixture model (GMM) or a deep neural network (DNN) model.

2. The device for generating synchronous corpus according to claim 1, wherein the voice synthesizer is configured to convert the text into the normal voice signal using a text to speech (TTS) technology.

3. The device for generating synchronous corpus according to claim 1, wherein the phoneme database is a consonant database and the normal phoneme data are normal consonant data.

4. The device for generating synchronous corpus according to claim 1, wherein the syllable detector is configured to detect the positions of the normal consonant signal and the dysarthria consonant signal using an autocorrelation function or a deep neural network (DNN).

5. The device for generating synchronous corpus according to claim 1, further comprising a voice smoothing circuit electrically connected to the voice synthesizer and configured to receive the synthesized voice signal and filter out noise of the synthesized voice signal, and a filtered the synthesized voice signal and the dysarthria voice signal are provided to train the voice conversion model.

6. The device for generating synchronous corpus according to claim 5, wherein the voice smoothing circuit is a filter.

7. The device for generating synchronous corpus according to claim 1, further comprising a text scanner electrically connected to the voice synthesizer and configured to scan a script to generate the script data.

8. A method for generating synchronous corpus comprising:
    receiving script data and a dysarthria voice signal having a dysarthria consonant signal and detecting a position of the dysarthria consonant signal, wherein the script data have text corresponding to the dysarthria voice signal; and
    searching normal phoneme data corresponding to the text, converting the text into a normal voice signal based on the normal phoneme data corresponding to the text, detecting a position of a normal consonant signal of the normal voice signal, replacing the dysarthria consonant signal with the normal consonant signal based on the position of the normal consonant signal and the position of the dysarthria consonant signal, thereby synchronously converting the dysarthria voice signal into a synthesized voice signal, and the synthesized voice signal and the dysarthria voice signal are provided to train a voice conversion model;

wherein the step of providing the synthesized voice signal and the dysarthria voice signal to train the voice conversion model includes:

receiving and framing the synthesized voice signal and the dysarthria voice signal to generate synthesized speech frames and dysarthria speech frames;

receiving the dysarthria speech frames and the synthesized speech frames to retrieve dysarthria speech features and corresponding synthesized speech features; and receiving the dysarthria speech features and the corresponding synthesized speech features to train the voice conversion model;

wherein the voice conversion model is a Gaussian mixture model (GMM) or a deep neural network (DNN) model.

9. The method for generating synchronous corpus according to claim 8, wherein in the step of converting the text into the normal voice signal, a text to speech (TTS) technology is used to convert the text into the normal voice signal.

10. The method for generating synchronous corpus according to claim 8, wherein the normal phoneme data are normal consonant data.

11. The method for generating synchronous corpus according to claim 8, wherein in the step of detecting the position of the dysarthria consonant signal, an autocorrelation function or a deep neural network (DNN) is used to detect the position of the dysarthria consonant signal.

12. The method for generating synchronous corpus according to claim 8, wherein in the step of detecting the position of the normal consonant signal, an autocorrelation function or a deep neural network (DNN) is used to detect the position of the normal consonant signal.

13. The method for generating synchronous corpus according to claim 8, wherein after the step of converting the dysarthria voice signal into the synthesized voice signal, noise of the synthesized voice signal is filtered out, and a filtered the synthesized voice signal and the dysarthria voice signal are provided to train the voice conversion model.

* * * * *